(12) United States Patent
Pisot

(10) Patent No.: US 8,408,247 B2
(45) Date of Patent: Apr. 2, 2013

(54) ELEMENT FOR CONTROLLING FILLING AND/OR DRAWING OF A PRESSURIZED GAS, TANK AND CIRCUIT PROVIDED WITH SUCH AN ELEMENT

(75) Inventor: Philippe Pisot, L'Isle Adam (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 686 days.

(21) Appl. No.: 12/091,678

(22) PCT Filed: Oct. 18, 2006

(86) PCT No.: PCT/FR2006/051053
§ 371 (c)(1),
(2), (4) Date: Jul. 25, 2008

(87) PCT Pub. No.: WO2007/048957
PCT Pub. Date: May 3, 2007

(65) Prior Publication Data
US 2009/0166359 A1    Jul. 2, 2009

(30) Foreign Application Priority Data
Oct. 27, 2005 (FR) .................................. 05 53261

(51) Int. Cl.
*B65D 90/00* (2006.01)
*G05D 16/00* (2006.01)
(52) U.S. Cl. .......... 137/613; 137/79; 137/81.1; 220/565
(58) Field of Classification Search ................... 137/613, 137/74, 75, 79, 80, 81.1; 220/565, 203.29
See application file for complete search history.

(56) References Cited

U.S. PATENT DOCUMENTS
2,756,105 A    7/1956    Magill
(Continued)

FOREIGN PATENT DOCUMENTS
DE    4334182    4/1995
EP    0467769    1/1992
(Continued)

OTHER PUBLICATIONS
International Search Report for PCT/FR2006/051053 published May 3, 2007.
(Continued)

*Primary Examiner* — Kevin Lee
(74) *Attorney, Agent, or Firm* — Christopher J. Cronin; Allen E. White

(57) ABSTRACT

The invention relates to an element for controlling filling and/or drawing of a pressurized gas, to be mounted in an opening of a tank (1), comprising a body (21) provided with at least one device (8) for controlling the circulation of gas placed between a first end, which has an opening (31) forming an inlet and/or an outlet for the gas with regard to the tank, and a second end for communicating with the inside of the tank. The control element also comprises a safety gas escape device (5) for evacuating the gas from the reservoir in the event of a dangerous situation and comprises a channel or gas escape circuit (215, 213, 212, 211, 31) running between a first end (215) for communicating with the pressurized gas of the tank and a second end (31) for communicating with a user circuit or with the atmosphere, the escape circuit being closed or not according to the state of a safety element (52), characterized in that the second end of the gas escape circuit (215, 213, 212, 211, 31) coincides with the opening (31) of the control element forming an inlet and/or an outlet for the gas.

17 Claims, 9 Drawing Sheets

U.S. PATENT DOCUMENTS

| | | | | |
|---|---|---|---|---|
| 3,035,605 | A | 5/1962 | Ninnelt | |
| 3,788,511 | A | 1/1974 | Marsh | |
| 3,921,872 | A | 11/1975 | Buell, Jr. | |
| 4,832,398 | A | 5/1989 | Tecca et al. | |
| 4,905,855 | A | 3/1990 | Troiano et al. | |
| 4,964,529 | A | 10/1990 | Houston | |
| 5,018,552 | A | 5/1991 | Politi et al. | |
| 5,127,436 | A | 7/1992 | Campion et al. | |
| 5,452,738 | A * | 9/1995 | Borland et al. | 137/74 |
| 5,465,754 | A * | 11/1995 | Sudo et al. | 137/614.2 |
| 5,562,117 | A | 10/1996 | Borland | |
| 5,829,629 | A | 11/1998 | Usher | |
| 5,975,121 | A | 11/1999 | Arzenton et al. | |
| 6,539,970 | B1 | 4/2003 | Knowles et al. | |
| 6,557,821 | B2 | 5/2003 | Girouard et al. | |
| 6,620,256 | B1 | 9/2003 | Arno | |
| 6,691,729 | B2 * | 2/2004 | Takeda et al. | 137/74 |
| 6,786,131 | B2 | 9/2004 | Tsai | |
| 6,929,028 | B2 * | 8/2005 | Larsen et al. | 137/613 |
| 8,171,950 | B2 * | 5/2012 | Colby et al. | 137/15.01 |
| 8,225,816 | B2 * | 7/2012 | Denis et al. | 137/613 |
| 2002/0036278 | A1 | 3/2002 | Girouard et al. | |
| 2004/0144803 | A1 | 7/2004 | Baker | |
| 2006/0065672 | A1 | 3/2006 | Lecourt et al. | |
| 2008/0308181 | A1 | 12/2008 | Denis et al. | |
| 2009/0223580 | A1 | 9/2009 | Denis et al. | |
| 2009/0223976 | A1 | 9/2009 | Denis et al. | |
| 2010/0059142 | A1 | 3/2010 | Denis | |

FOREIGN PATENT DOCUMENTS

| | | |
|---|---|---|
| EP | 0668468 | 8/1995 |
| EP | 1 143 191 | 4/2000 |
| EP | 1 026 438 | 8/2000 |
| EP | 1316755 | 6/2003 |
| EP | 1367316 | 12/2003 |
| EP | 1 943 456 | 7/2008 |
| FR | 2 716 951 | 9/1995 |
| FR | 2 774 452 | 8/1999 |
| FR | 2 793 297 | 11/2000 |
| FR | 2 803 366 | 7/2001 |
| FR | 2 892 797 | 5/2007 |
| FR | 2 892 798 | 5/2007 |
| FR | 2 892 799 | 5/2007 |
| WO | WO 2007 048952 | 5/2007 |
| WO | WO 2007 048953 | 5/2007 |
| WO | WO 2007 048954 | 5/2007 |
| WO | WO 2007 048955 | 5/2007 |
| WO | WO 2007 048956 | 5/2007 |
| WO | WO 2007 048957 | 5/2007 |

OTHER PUBLICATIONS

French Search Report for related FR 0552598, Oct. 7, 1998.
French Search Report for related FR 0571098, Feb. 4, 2000.
French Search Report for related FR 0581212, Oct. 18, 2000.
US Office Action for related U.S. Appl. No. 12/091,657, Jun. 8, 2011.
Response to Office Action for related U.S. Appl. No. 12/091,657, Sep. 8, 2011.
Supplemental Response to Office Action for related U.S. Appl. No. 12/091,657, Sep. 12, 2011.
Pending claim set for related U.S. Appl. No. 12/091,657, Sep. 12, 2011.
French Search Report and Written Opinion for related FR 4553261, Jul. 20, 2006.
International Search Report and Written Opinion for related PCT/FR2006/051049, Feb. 13, 2007.
French Search Report for related FR 0553263, Jun. 29, 2006.
International Search Report and Written Opinion for related PCT/FR2006/051048, Feb. 5, 2007.
Pending claim set for related U.S. Appl. No. 12/091,669, Apr. 25, 2008.
US Office Action for related U.S. Appl. No. 12/091,669, Jul. 14, 2011.
French Search Report for related FR 0553265, Jun. 29, 2006.
International Search Report and Written Opinion for related PCT/FR2006/051047, Feb. 5, 2007.
Written Opinion for corresponding PCT/FR2006/051053, Feb. 20, 2007.
US Office Action for related U.S. Appl. No. 12/091,683, Jun. 21, 2011.
Response to Office Action for related U.S. Appl. No. 12/091,683, Sep. 21, 2011.
Pending claim set for related U.S. Appl. No. 12/091,683, Sep. 21, 2011.
International Search Report and Written Opinion for related PCT/FR2006/051050, Feb. 13, 2007.
US Office Action for related U.S. Appl. No. 12/091,690, Jun. 23, 2011.
Response to Office Action for related U.S. Appl. No. 12/091,690, Sep. 22, 2011.
Pending claim set for related U.S. Appl. No. 12/091,690, Sep. 22, 2011.

* cited by examiner

ELEMENT FOR CONTROLLING FILLING AND/OR DRAWING OF A PRESSURIZED GAS, TANK AND CIRCUIT PROVIDED WITH SUCH AN ELEMENT

This application is a 371 of International PCT Application PCT/FR2006/051053, filed Oct. 18, 2006.

BACKGROUND

1. Field of the Invention

The present invention relates to a member for controlling filling and/or drawing of a pressurized gas and to a tank and a circuit which are provided with such a member.

2. Related Art

Among known solutions for storage in gaseous form, bottles equipped with a simple tap are very favorable to operators and manufacturers for stock management purposes. If it is open, the simple tap puts the user directly into contact with the fluid at its storage pressure. In order to use the gas, it is thus necessary to connect various equipment (regulator, flowmeter, etc.) that requires tools and tedious operations. This type of operation entails risks especially when the user is not professional. This solution is thus not favorable to the end user.

More favorable to the end user is the regulator tap attached to the bottle and delivering the fluid at the pressure needed for the application. However, operating with such a tap involves significant constraints for manufacturers particularly in terms of stock management, maintenance and interface with the filling equipment.

Hence, none of the aforementioned existing solutions simultaneously takes account of the specific needs of the manufacturer and the customer.

Moreover, particularly in the field of storing combustible gases used as energy source on board vehicles (such as, for example, hydrogen for fuel cell vehicles or internal combustion engine vehicles), the normative and regulatory references or the safety rules demand the presence of a pressure-limiting safety member (pressure relief valve or PRD) which, in the event of fire, allows the complete evacuation of the gas contained in the tanks to the atmosphere, thus preventing these tanks from bursting.

In one configuration of a fixed tank on board a user system (for example a vehicle), the safety members are defined and consequently positioned permanently thereon. However, the problem is more complicated for gas storage devices intended to be placed on board following the "replacement of an empty tank by a full tank" principle. This is because, in the case of mobile containers, the safety member must follow the container throughout its life cycle (both outside and inside the user system).

The double life of these gas storage devices (on the one hand used as onboard tanks and on the other hand transported or stored under pressure during logistics phases) requires that the safety members have different behaviors according to the use phase.

The size, mass, structural simplicity and ease of use of these tanks and their control members are crucial factors for their large-scale use in a gas supply system of the "replacement of an empty tank by a full tank" type.

Conventional bottles equipped with a simple tap do not generally have a safety valve or limiter of the PRD type. In order to use the gas, it is thus necessary to connect the bottle to an onboard installation having at least one safety member of this type. The installation must also comprise a regulator. This increases the risks during use, especially when the user is not professional (leaks, projection of parts, etc.).

The invention thus aims to solve all or some of the aforementioned problems so as to provide, for example, a level of safety and efficiency in the storage and use of pressurized gas that satisfies all or some of the use constraints above and allows handling operations especially by non-specialists.

SUMMARY OF THE INVENTION

The invention thus relates to a member for controlling filling and/or drawing of a pressurized gas that is intended to be mounted in an orifice of a tank, comprising a body provided with at least one gas flow control device arranged between a first end, comprising an orifice forming an inlet and/or an outlet for the gas with respect to the tank, and a second end intended to communicate with the inside of the tank, the control member additionally comprising a gas escape safety device for evacuating the gas from the tank in the event of a risk situation and comprising a gas escape channel or circuit extending between a first end, intended to communicate with the pressurized gas of the tank, and a second end intended to communicate with a user circuit or with the atmosphere, the escape circuit being either shut off or not depending on the state of a safety element.

According to one advantageous particular feature, the second end of the gas escape circuit coincides with the control member orifice forming an inlet and/or an outlet for the gas.

BRIEF DESCRIPTION OF THE FIGURES

Other particular features and advantages will become apparent on reading the description below, given with reference to the figures, in which.

DETAILED DESCRIPTION OF THE INVENTION

Figure 1:
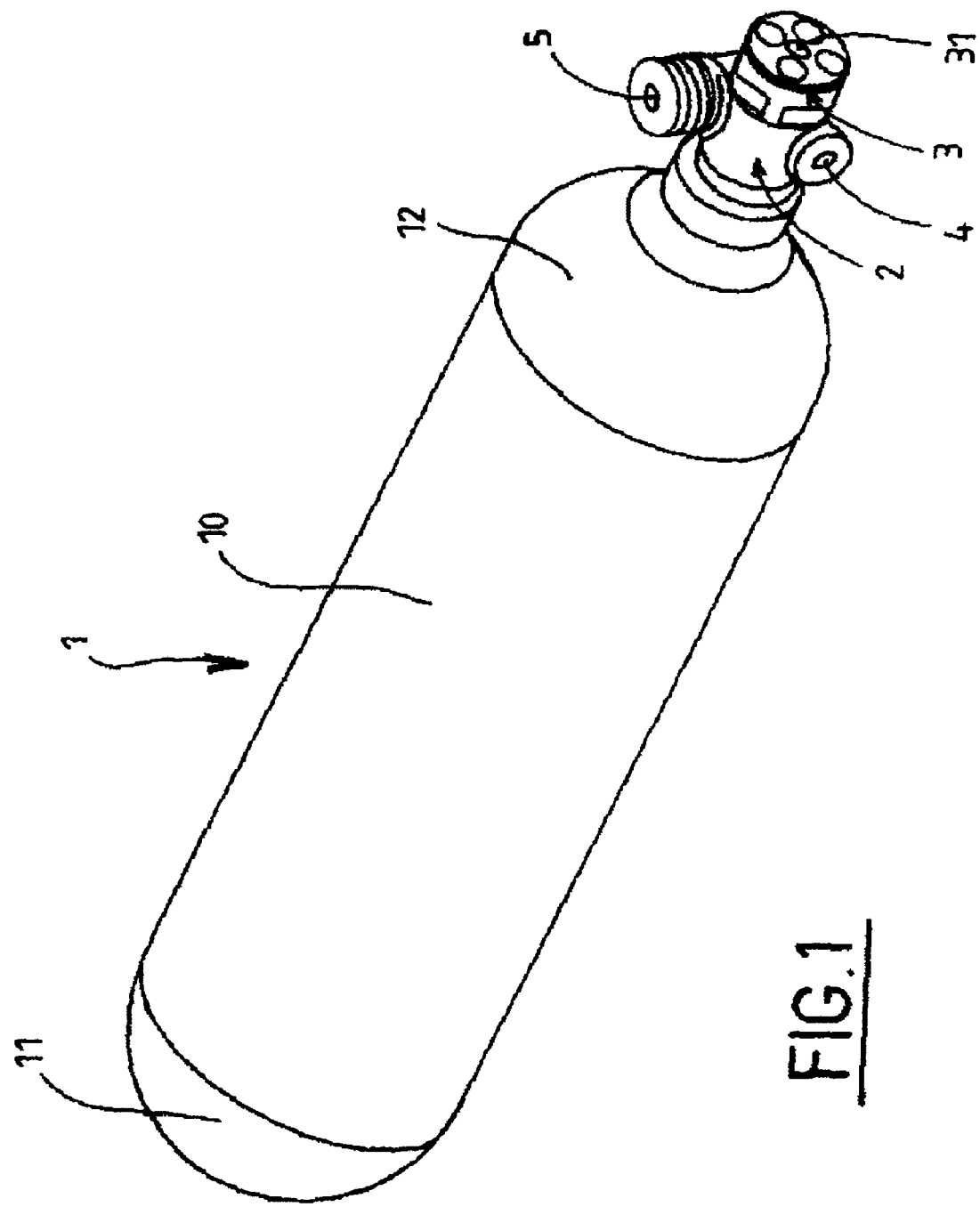
FIG. 1 is an external view, in isometric perspective, of an exemplary embodiment according to the invention of a gas storage assembly provided with a member for controlling filling and/or drawing of a pressurized gas.

Moreover, embodiments of the invention may comprise one or more of the following characteristics:

the second end of the gas escape circuit coincides with a control member inlet/outlet orifice intended both to let gas in (filling) and to let gas out (drawing);

the member comprises an expansion portion accommodating a pre-expansion device, the control member additionally comprising a mounting portion intended to be mounted in the orifice of a tank, the expansion portion and the mounting portion being arranged relatively on the body in such a way as to arrange the expansion portion at least partially inside the volume of a tank when the member is in the mounted position;

the safety element and the expansion portion are respectively arranged substantially on either side of the mounting portion in such a way as to arrange the safety element at least partially outside a volume of a tank when the member is in the mounted position;

the safety device comprises a shut-off element capable of being moved between a position in which it shuts off the gas escape circuits and a position in which it does not obstruct this circuit, the safety element forming a retractable stop for retaining the shut-off element in the shut-off position;

the member comprises a filling channel or circuit for the pressurized gas that extends between a first end, intended to be connected to a pressurized filling gas source, and a second end intended to communicate with a tank, a filling valve device being arranged on the filling circuit, the filling valve being dimensioned to open only above a threshold pressure so as to allow pressurized gas to flow between the two ends of the filling circuit only in a filling direction and when the pressure of the filling gas exceeds said threshold;

the filling valve is able to move relative to a seat secured to a frame, the element for shutting off the escape channel comprising said frame;

the filling and escape circuits comprise at least one common portion;

the member comprises a gas drawing circuit extending between a first end, intended to be connected in the mounted position with the inside of the tank, and a second end intended to be connected to a user circuit which uses the gas drawn from the tank;

the member comprises, arranged in the drawing circuit and in addition to a pre-expansion device, at least one of the control elements from the following group: a gas filtering element, a device forming a residual pressure valve, and an isolating valve;

the member comprises, arranged in series in the drawing circuit between the first and the second end: a gas filtering element, a device forming a residual pressure valve, the pre-expansion device and an isolating valve;

the drawing circuit is substantially rectilinear between its two ends;

the member comprises a high-pressure discharge valve having a first end, intended to be connected with the pressurized gas in the mounted position, and a second end connected to an outlet for evacuating fluid when the pressure exceeds a defined value above a threshold;

the safety element comprises at least one of the safety elements from the following group: a thermal fuse, a rupture disk, a discharge valve, and a valve controlled as a function of a measured pressure and/or temperature;

the safety element of the safety device (for example a thermal fuse) comprises or constitutes the high-pressure discharge valve, the safety element comprises a spring urging the shut-off element toward its shut-off position, the preload force of which spring is greater than the force caused by the pressure of the fluid stored under normal use conditions (that is to say outside an overpressure risk situation);

that portion of the escape circuit situated between the shut-off element and the first end comprises a channel formed in the body of the member and capable of bringing the shut-off element directly into communication with the pressurized gas in the reservoir in the mounted position;

in the mounted position, the shut-off element is urged by the pressurized gas toward its non-shut-off position;

the escape and drawing circuits are separate and substantially parallel over at least some of their length;

the exhaust and drawing circuits have a common portion at least at the level of the inlet/outlet orifice of the member;

the filling and escape circuits are common, that is to say that the gas follows substantially the same circuit, in opposite directions, while being filled and while escaping for safety reasons;

the control member has a substantially oblong and cylindrical shape;

the control member comprises a device for measuring a physical variable such as the pressure representative of the contents, this device being able to be connected directly to the pressurized gas in the mounted position and being able to cooperate with means for displaying said physical variable that are situated on the control member and/or remotely;

the mounting portion of the filling control member is substantially cylindrical or conical and comprises at least one fastening element such as threads which are intended to cooperate with a complementary surface such as a tapped thread on a container neck;

the mounting portion of the control member comprises an element intended to ensure leaktightness with the container during a tightening operation, such as a Teflon® layer;

the isolating valve is housed inside the volume of the control member and comprises an end accessible via an inlet/outlet orifice provided with a retractable shutter, the isolating valve being able to be moved between a position of opening and a position of closing the drawing circuit under the action of a complementary end of a user apparatus introduced into the body of the control member via the inlet/outlet orifice;

the body of the control member comprises a portion forming a connection interface for a user circuit or apparatus which uses the gas passing via the control member, the portion forming a connection interface and the expansion portion being respectively arranged substantially on either side of the mounting portion in such a way as to arrange the portion forming a connection interface at least partially outside the volume of the tank when the member is in the mounted position;

the invention may also relate to a vehicle comprising a control member or a control member/container assembly according to any one of the characteristics above;

the gas is hydrogen or contains hydrogen.

Another object of the invention is to provide a pressurized gas container comprising an orifice and a filling and/or drawing control member according to any one of the characteristics above.

Another object of the invention is to provide a pressurized gas use circuit which comprises a container connected to the use circuit via the control member, the circuit being connected to the inlet/outlet orifice of the control member, the circuit comprising a mechanism forming a high-pressure safety valve capable of evacuating the pressurized escape gas toward the atmosphere or into a defined safeguarded region.

According to other particular features, the circuit comprises a main line connected to a gas user and an auxiliary safety line connected to the main line, the mechanism forming a high-pressure safety valve being situated in the main line and/or in the auxiliary line.

The non-limiting embodiment shown in FIG. 1 depicts the oblong body of a gas tank 1 having a cylindrical main central part 10 and two dome-shaped ends 11 and 12. The tank 1 is preferably made of composite materials, for example an aluminum alloy liner reinforced by a filament winding of carbon fibers bound together by epoxy resin.

One rounded end 12 of the tank 1 comprises an inlet/outlet orifice for the fluid, in which orifice is mounted a member 2 for controlling filling and/or drawing of the gas. In the mounted position on the tank 1, a first portion of the control member 2 is situated inside the volume of the tank 1 and a second portion projects outside the tank 1. The control member 2 comprises in its external portion a connection interface 3 intended to cooperate by latching with complementary latching parts borne, for example, by a user apparatus, a circuit or a device for filling the tank 1.

Moreover, the control member 2 comprises, in its part situated outside the tank 1, an indicator 4 showing the state of the contents, such as a pressure gauge, and a gas escape safety device 5 described in more detail below.

The external end of the control member 2 is provided with a central orifice 31 designed to give access to the inside of the tank 1.

Figure 2:
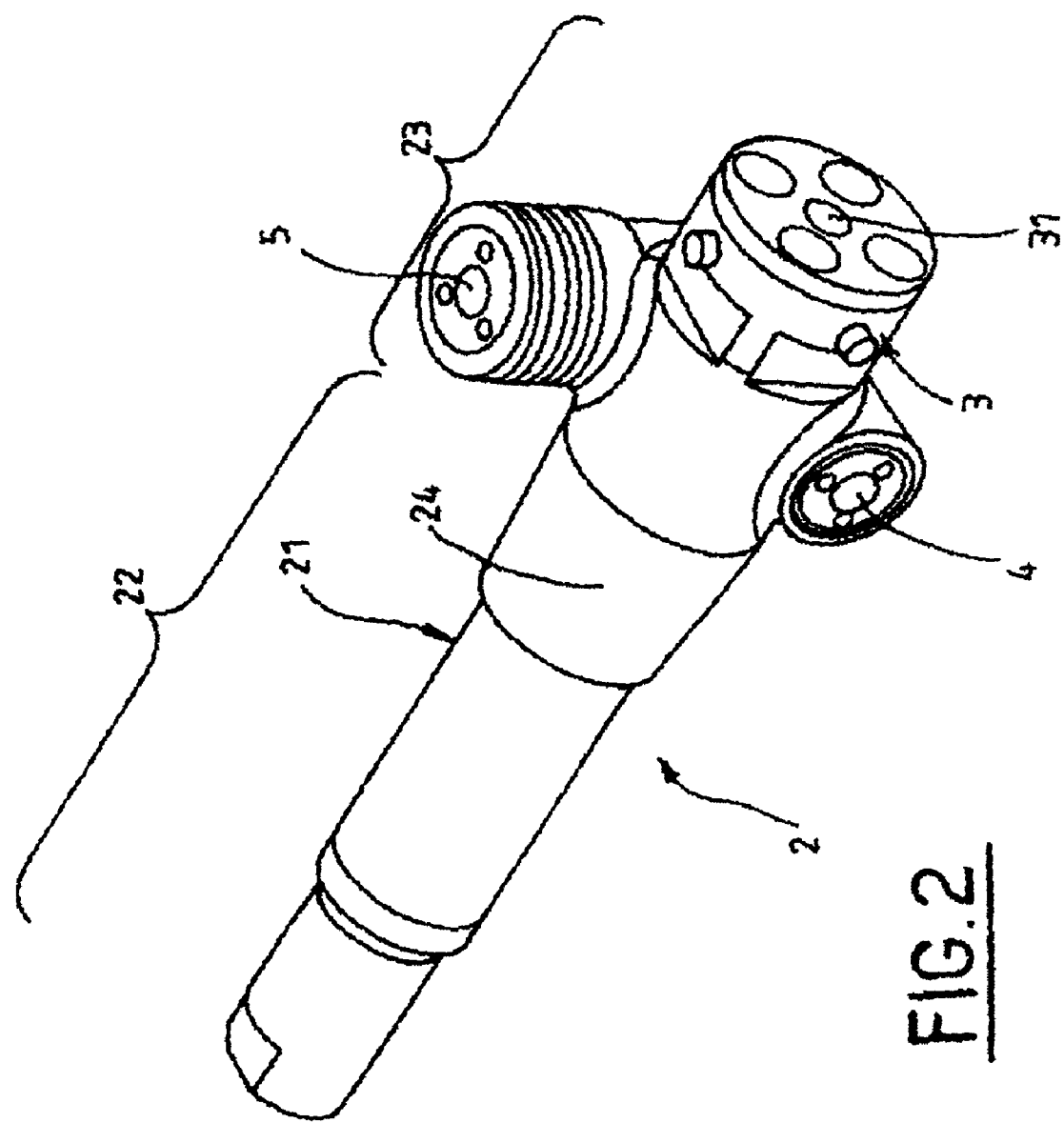
FIG. 2 is an external view, in isometric perspective, of the control member shown in FIG. 1.

FIG. 2 depicts the control member 2 away from the storage tank 1. This control member 2 is composed of an oblong body 21 of generally cylindrical shape substantially comprising, in its central part, a threaded conical coupling 24 intended for the leaktight fastening of said member 2 in the orifice of the storage tank 1.

In the mounted position on a tank 1, a first part 22 of the volume of the control member is thus situated inside the tank 1 while a second part 23 of the volume of the member 2 is situated outside the tank 1, thus offering access to the connection interface 3, to the indicator 4 showing the state of the contents, to the safety device 5, and to the central orifice 31 which allows gas to be filled and/or drawn.

Figure 3:
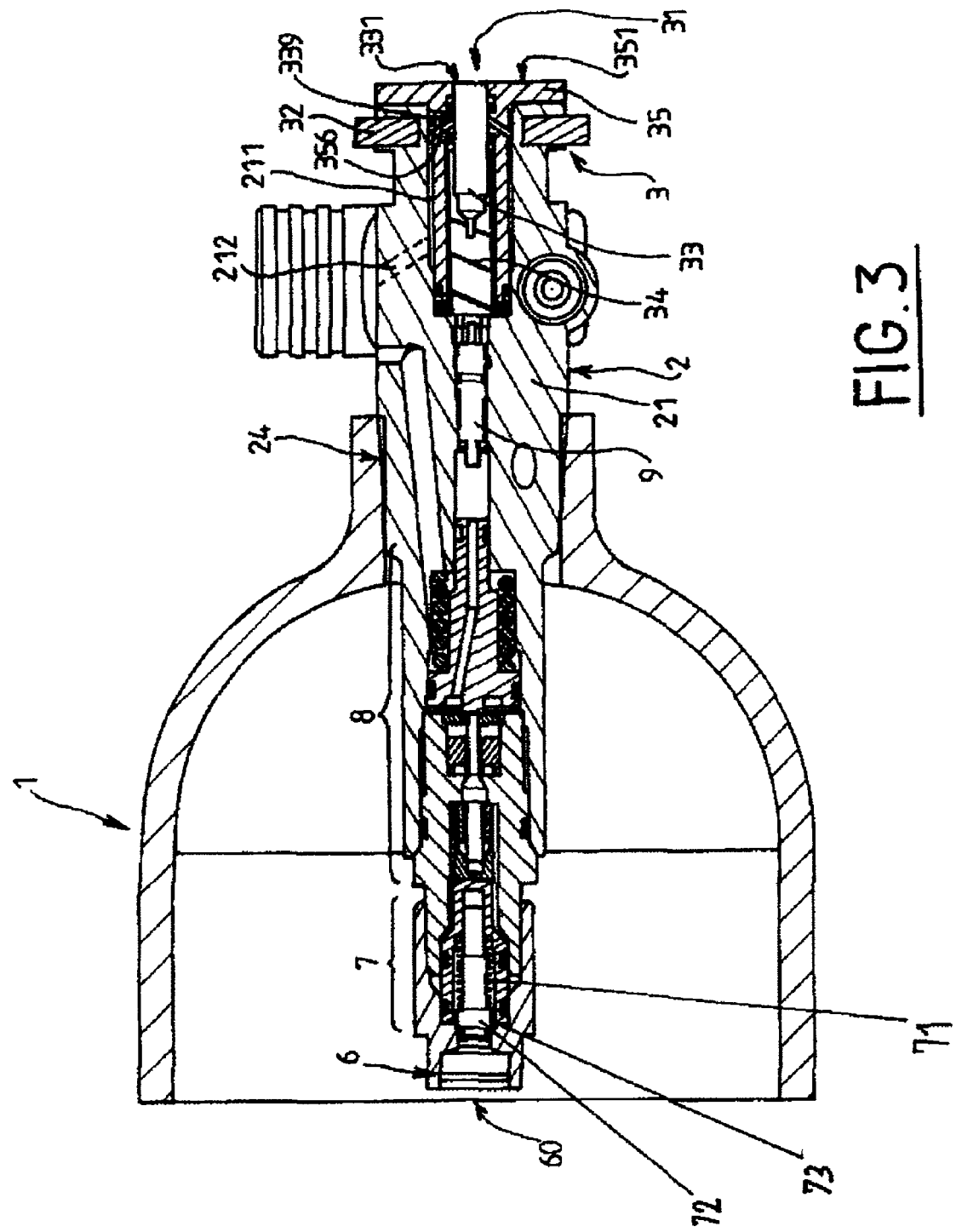
FIG. 3 is a larger-scale view in longitudinal section of a detail of the gas storage assembly and the control member shown in FIG. 1.

Referring to FIG. 3, the body 21 of the control member 2 is joined mechanically to the tank 1 by means of the conical screw thread 24 cooperating with a tapped thread formed in the neck of the tank 1. Leaktightness between the member 2 and the tank 1 can be maintained, for example, particularly using a Teflon strip applied to the threads.

The control member 2 incorporates within its volume, substantially at the level of its first end, from upstream to downstream: a member 6 for filtering the drawn gas, a residual pressure valve 7 permanently maintaining a minimum pressure (for example about 3 bar) of gas in the tank 1 to prevent its contamination, a pre-expansion member 8 allowing the gas to leave at a defined pressure close to the pressure needed for the application, and an isolating valve 9 making it possible to allow or interrupt the drawing of the gas. As represented in FIG. 3, part of the pre-expansion member 8 can project from the first end of the body 21 of the control member 2, the residual pressure valve 7 and the member 6 for filtering the drawn gas being mounted on this projecting part of the pre-expansion member 8.

The connection interface 3 is embodied by four protruding studs 32 (or bayonets) which allow couplings having complementary imprints to be latched on in order to fill the tank 1 with gas or draw the gas contained therein. The central orifice 31 of the gas filling and/or drawing control member 2 can be protected from external particles by means of a movable shutter 33. The movable shutter 33 has, for example, the form of a pin which is subjected to the action of a return spring 34 toward a closure or rest position of the orifice 31 in which the end surface 331 of said shutter 33 coincides with the front surface 351 of a cannula 35 of the connection interface 3. The cannula 35 is partly housed in the body 21 of the control member 2.

Figure 8:
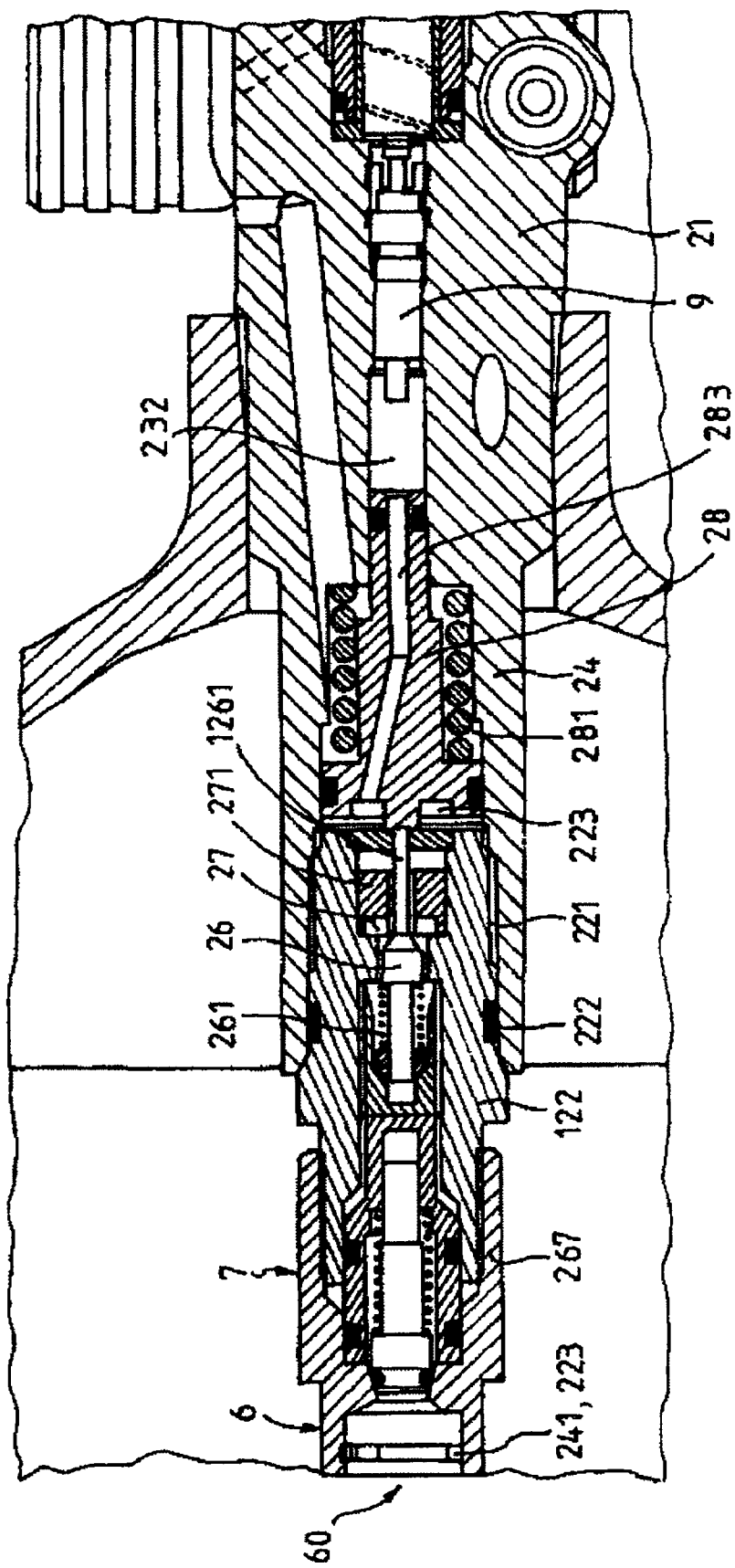
FIG. 8 is an enlarged view of a detail shown in FIG. 3.

As represented in an enlarged manner in FIG. 8, the pre-expansion member 8 can be contained within a pre-expansion cartridge 122 screwed into the body 24 of the control member 2 via a screw thread/tapped thread system 221.

Upstream of the pre-expansion member 8, the control member 2 comprises a filter 6 followed by a residual pressure valve 7 known per se. Such a residual pressure valve operates schematically in the following way: the spring 71 acts on the valve element 72 and tends to naturally seal the residual pressure valve element 72 on its seat 73. As long as the force of the gas pressure on the cross section of the valve element 72 is greater than the force of the spring 71, the valve allows fluid to flow. The residual pressure valve element 72 closes the circuit when the force of the gas pressure on the cross section of said valve element 72 is insufficient to overcome the force of the spring 71. This level of pressure (above atmospheric pressure, for example of around 3 bar) is that which will remain inside the tank at the end of the use phase in order to prevent various contaminations. This residual pressure valve 7 allows fluid to flow, for example, only in the direction of gas outflow toward the outside (in the direction of the orifice 31) and only when the pressure of the gas is above a threshold permitting opening of this valve 7 (for example 3 bar). The filter 6 and the residual pressure valve 7 are, for example, housed in a casing 267 screwed onto the upstream end of the pre-expansion cartridge 122.

Downstream of the pre-expansion member 8 (toward the outlet 31), the control member 2 comprises a low-pressure chamber 223. Leaktightness between the inside of the tank 1 and the low-pressure chamber 223 is ensured, for example, by the combination 222 of an O-ring seal and anti-extrusion rings arranged between the cartridge 122 and the body 24 of the control member 2. The filter 6 is retained in the cartridge 22 for example by means of a spring ring 241 housed in a groove 223 formed in the casing 267.

The valve element 26 of the pre-expansion member 8 is subjected to the action of a spring 261 toward a seat 27 retained in the cartridge 122 under the action of a threaded seat holder 271. The valve element 26 is subjected to the force of the valve spring 261 and to the force of the pressurized gas.

The downstream end of the valve element 26 is provided with a stem 1261 whose end is in contact with a pre-expansion piston 28. This piston 28 is subjected for its part to a stress exerted by a spring 281 in the direction of the pre-expansion valve element 26. Owing to the force of the spring 281 and the action of the gas on the downstream cross section of the piston 28, the valve element 26 performs a pressure-regulating function.

During phases in which gas is drawn from the tank 1, the gas contained in the tank 1 under high pressure passes via the filter 6 and then expands in the cartridge 122 toward the low-pressure chamber 223.

The expanded gas then passes through the piston 28 by way of a bore 283 formed in the body of the piston 26 so as to emerge in a chamber 232 situated upstream of the isolating valve 9. The isolating valve 9 ensures leaktightness between the body 21 and the inside of the tank 1 by means of seal systems or the like.

The isolating valve 9 is closed by default. The isolating valve 9 is, for example, a valve of conventional type, such as a valve comprising a fixed tubular body and a spindle which can move inside the body and make the valve capable of allowing fluid to flow or not depending on the position of the spindle.

The valve 9 can be actuated via a valve pusher belonging, for example, to a storage assembly user system or to a gas distribution head.

Figure 4:
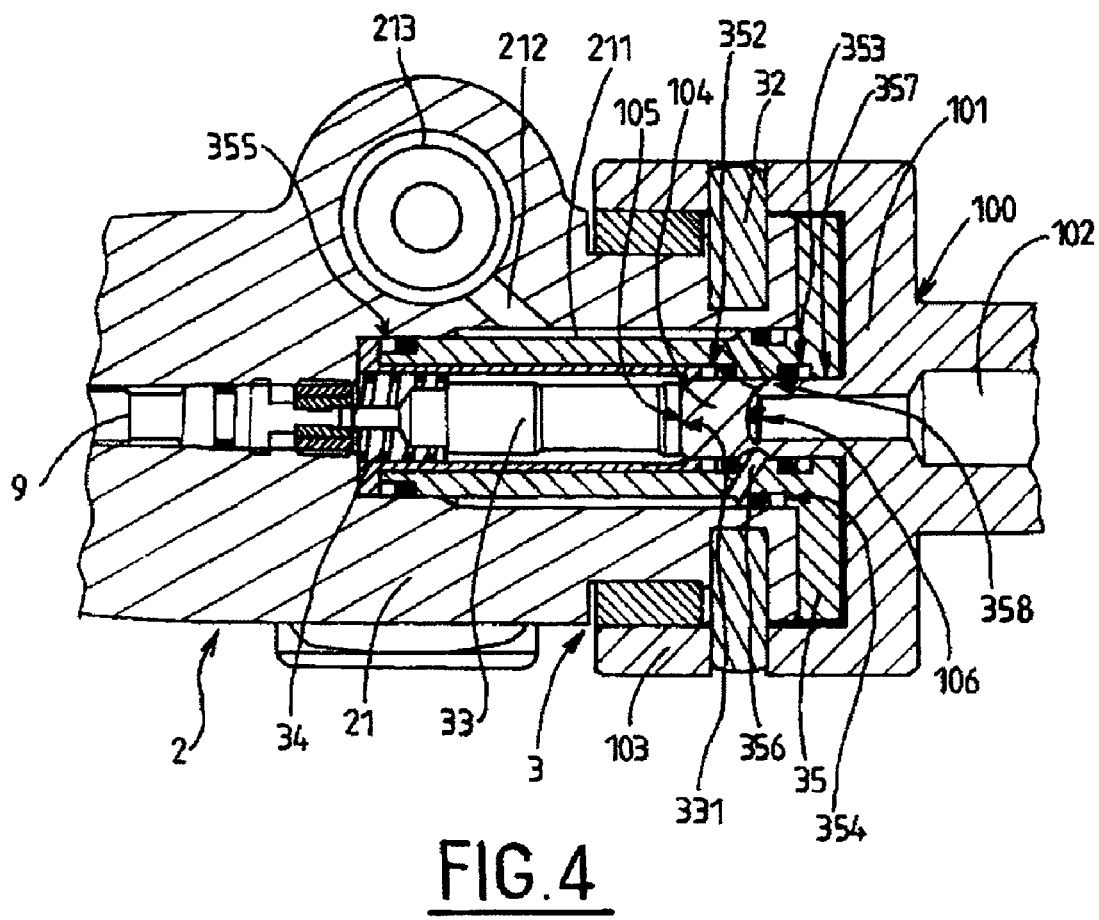
FIG. 4 is a view in longitudinal section of a connection interface of the control member shown in FIGS. 1 to 3, in a position in which it is connected to a filling adapter.

According to the embodiment in FIG. 4, the end of a filling adapter 100 is coupled to the external end of the control member 2. More precisely, the filling adapter 100 has a body 101 and a connection interface comprising imprints 103 which are able to cooperate with the protruding studs 32 of the connection interface 3 of the control member 2.

The connection interface of the filling adapter 100 comprises a pin or spigot 104 dimensioned to be housed in the central well 357 of the cannula 35. Thus, when the connection interface of the filling adapter 100 is engaged and cooperates with the connection interface 3 of the member 2, the pin 104 is housed coaxially in the well 357 of the cannula 35. Furthermore, the end 105 of the pin 104 of the filling adapter 100 comes into contact with the downstream surface 331 of the shutter 33, pushing this shutter away while combating the force of the spring 34.

When the connection interface of the filling adapter 100 is in the final position on the connection interface 3 of the member 2, the front outer peripheral surface of the pin 104 is in contact with a first sealing device 352 comprising, for example, a seal and an anti-extrusion ring, whereas a rear outer portion of the pin 104 is in contact with a second sealing device comprising a seal and an anti-extrusion ring 353. Between these two portions, the peripheral surface of the pin forms a leaktight annular chamber 358 (local constriction of the pin 104 for example) between the pin 104 and the cannula 35 of the control member 2.

During an operation of filling the tank 1, the filling fluid is drained through the filling adapter 100 via a central duct 102 which emerges in the annular chamber 358. For example, the central duct 102 which emerges in the annular chamber 358 by way of radial orifices 106 formed through the central part of the pin 104.

The filling fluid then passes through the cannula 35 via holes or ducts 356 so as to arrive in an annular chamber 211 formed between the body 21 and the cannula 35. Leaktightness of the chamber 211 is ensured via, for example, two sealing assemblies 354, 355 each comprising for example a seal and an anti-extrusion ring. The annular chamber 211 then drains the filling fluid toward a bore 212 which emerges in an annular chamber 213 of the safety device 5.

Figure 5:
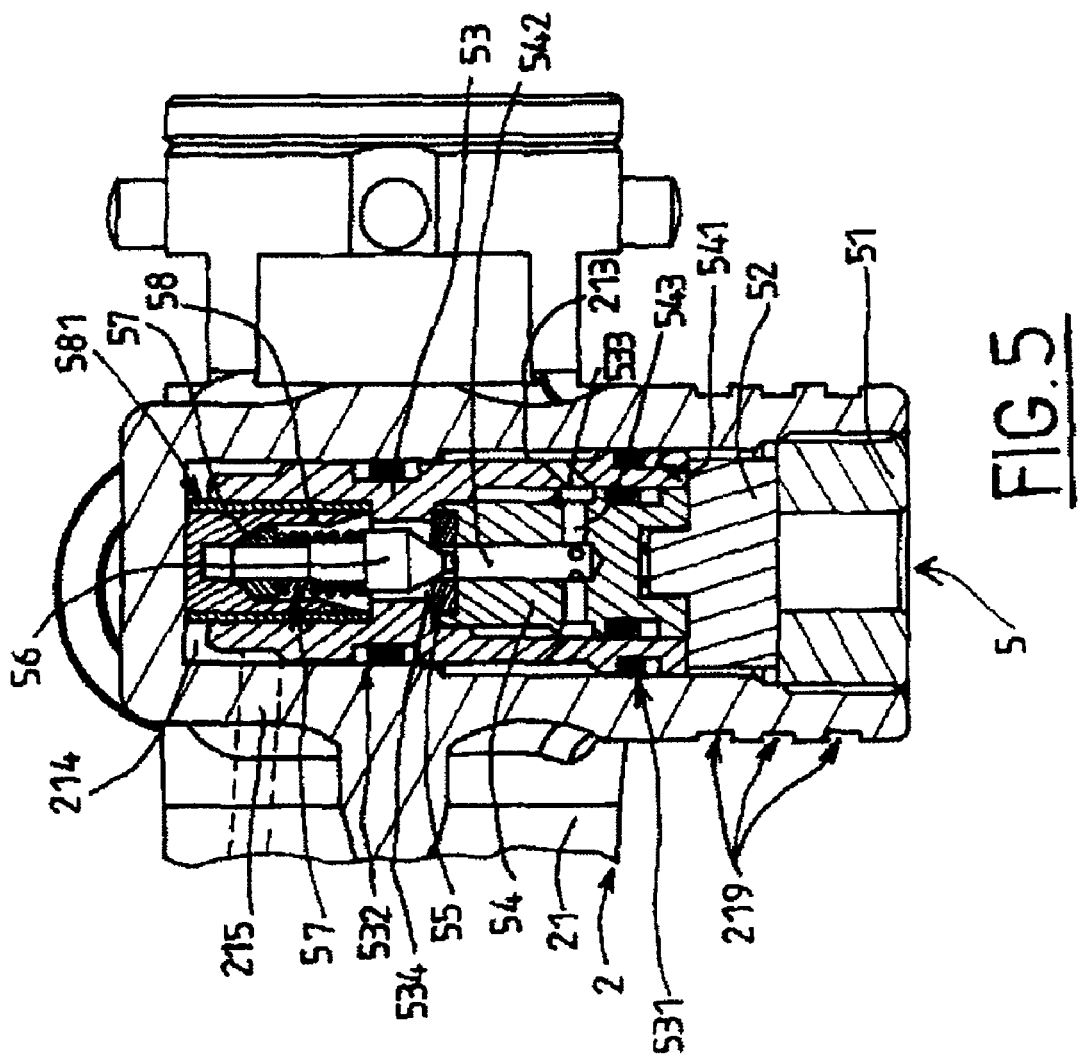
FIG. 5 is a partial view in longitudinal section of the control member shown in FIG. 2 on a plane passing through the axis of a gas escape safety device borne by the control member, the safety device being in the inactive position.

FIG. 5 shows in more detail the safety device 5 housed in the body of the filling and/or drawing control member 2. As represented, the safety device 5 can be contained within a volume projecting transversely from the oblong body of the control member 2.

The safety device 5 comprises a cartridge body 53 or frame which encloses a valve element 56. The valve element 56 is naturally maintained, in a position in which it shuts off the flow of fluid in a leaktight manner, against a seat 55 under the action of a spring 57. The seat 55, which is preferably not made of metal, is centered and maintained in a leaktight manner relative to the body by means of a seat holder 54 screwed, for example, into the cartridge body 53.

A plug 51 having a fusible spacer 52 (such as a eutectic alloy with a low melting point, for example a bismuth-indium alloy) encloses the cartridge 53 in a well of the body 21 of the member 2. The plug 51 is, for example, screwed into the end of the well of the body 21 of the control member 2.

To ensure particularly effective heat transfer between the ambient environment and the fusible spacer 52, the plug 51 preferably has a high thermal conductivity; it consists, for example, of a copper alloy. Moreover, grooves 219 can be formed in the body 21 to increase the heat-exchange area with the ambient environment in the region where the fuse 52 is situated.

The filling fluid entering the annular chamber 213, which is leaktight between the cartridge 53 and the body 21 (seals and anti-extrusion rings 531 and 532), successively passes through the cartridge 53 via first lateral orifices 533 and then passes through the seat holder 54 via the second bores 543. The fluid then follows the central duct 542 of the seat holder 54 which emerges at the level of the valve element 56.

The valve element 56 opens under the force of a defined pressure of the filling fluid (above a defined threshold pressure to prevent contamination of the contents of the tank 1). The opening of the valve element 56 allows the fluid to pass into an intermediate chamber 534.

Figure 9:
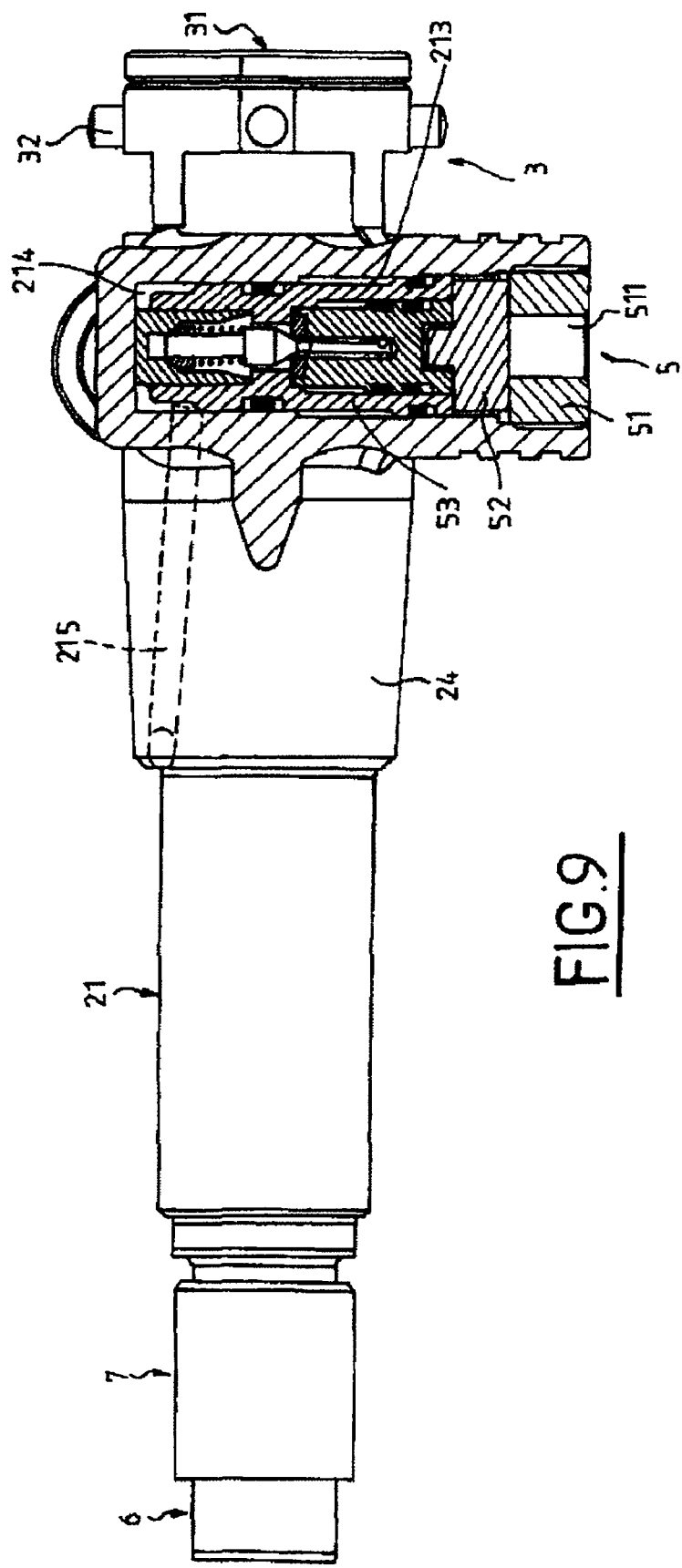
FIG. 9 is a view of the control member shown in FIG. 2 in section on a plane identical to the section plane shown in FIG. 5.

Countersinks 581 of a spacer 58 then drain the fluid into a downstream chamber 214. A bore 215 communicating on the one hand with the downstream chamber 214 and on the other hand with the inside of the tank 1 allows the fluid to be conveyed inside the tank. FIG. 9 schematically illustrates the bore 215 which emerges at the level of a shoulder delimiting the end of the threaded mounting portion 24 of the body 21 (the bore 215 emerges at the level of a portion situated in the tank 1 when the control member 2 is in the mounted position).

When the filling operation is completed and the filling circuit has optionally been purged, the valve element 56 automatically returns to its leaktight closure position on its seat 55 under the action of its spring and isolates the inside of the tank 1. The filling adapter can be withdrawn, the movable shutter 33 of the connection interface 3 then automatically returning to its rest position under the action of the spring 34.

Figure 6:
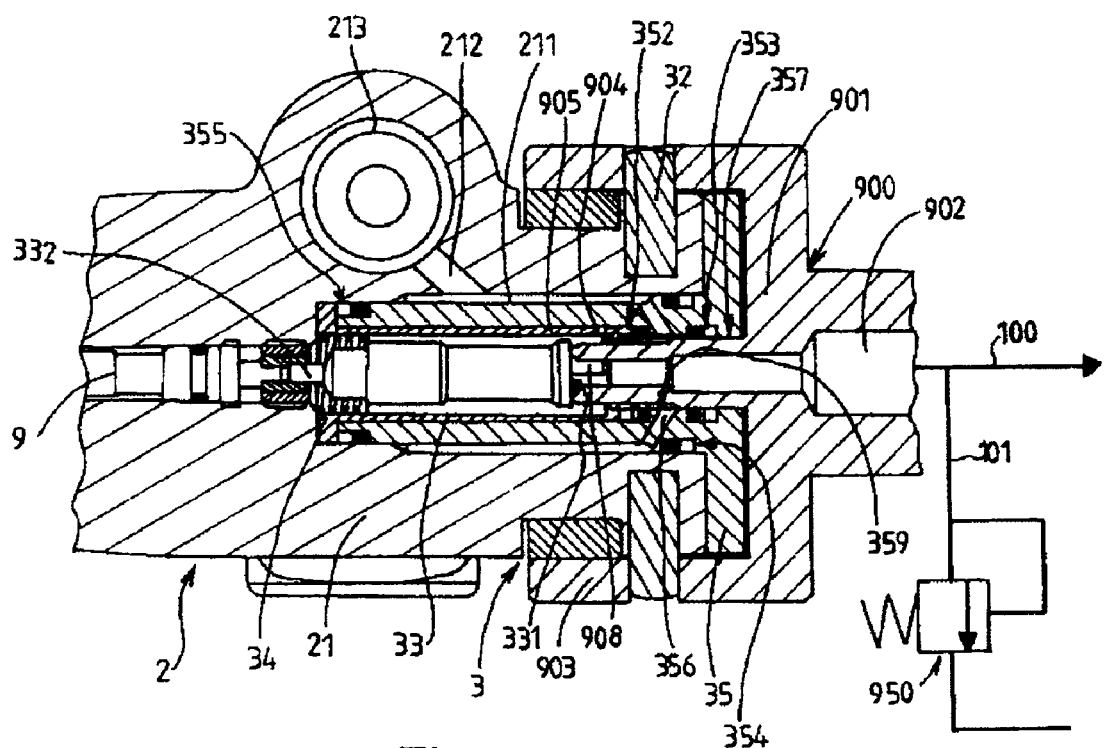
FIG. 6 is a view in longitudinal section of the connection interface of the control member in a position in which it is connected to an outlet coupling.

In FIG. 6, the gas filling and/or drawing control member 2 is connected to an output coupling 900 composed of a body 901 having a connection interface comprising imprints 903 cooperating with the protruding studs 32 of the connection interface 3.

When the connection interface of the outlet coupling 900 is engaged and cooperates with the connection interface 3 of the control member 2, the pin 904 of the outlet coupling 900 is housed coaxially in the well 357 of the cannula 35. The end 905 of the pin 904 of the outlet coupling 900 comes into contact with the surface 331 of the shutter 33. The pin 904 pushes away the shutter 33 while combating the force of the spring 34 until it opens the isolating valve 9 as a result of the contact of the stem 332 of the shutter 33 against the pin of the valve 9.

When the connection interface of the outlet coupling 900 is in the final position on the connection interface 3 of the member 2, the rear outer peripheral surface of the pin 904 is in contact with the downstream sealing assembly 353 comprising a seal and an anti-extrusion ring. In this way, the pin 904 is housed in a leaktight manner in the cannula 35 with respect to the outside.

The fluid drawn from the tank 1, once it has passed into the filtering member 6, then into the residual pressure valve 7 and into the pre-expansion member 8, passes through the isolating valve 9. The fluid then arrives in the chamber 358 containing the shutter 33 and then follows the milled-out aperture 908 to arrive in the central duct 902 of the outlet coupling 900 (through the pin 904 to be outwardly distributed into a network toward a user).

Figure 7:
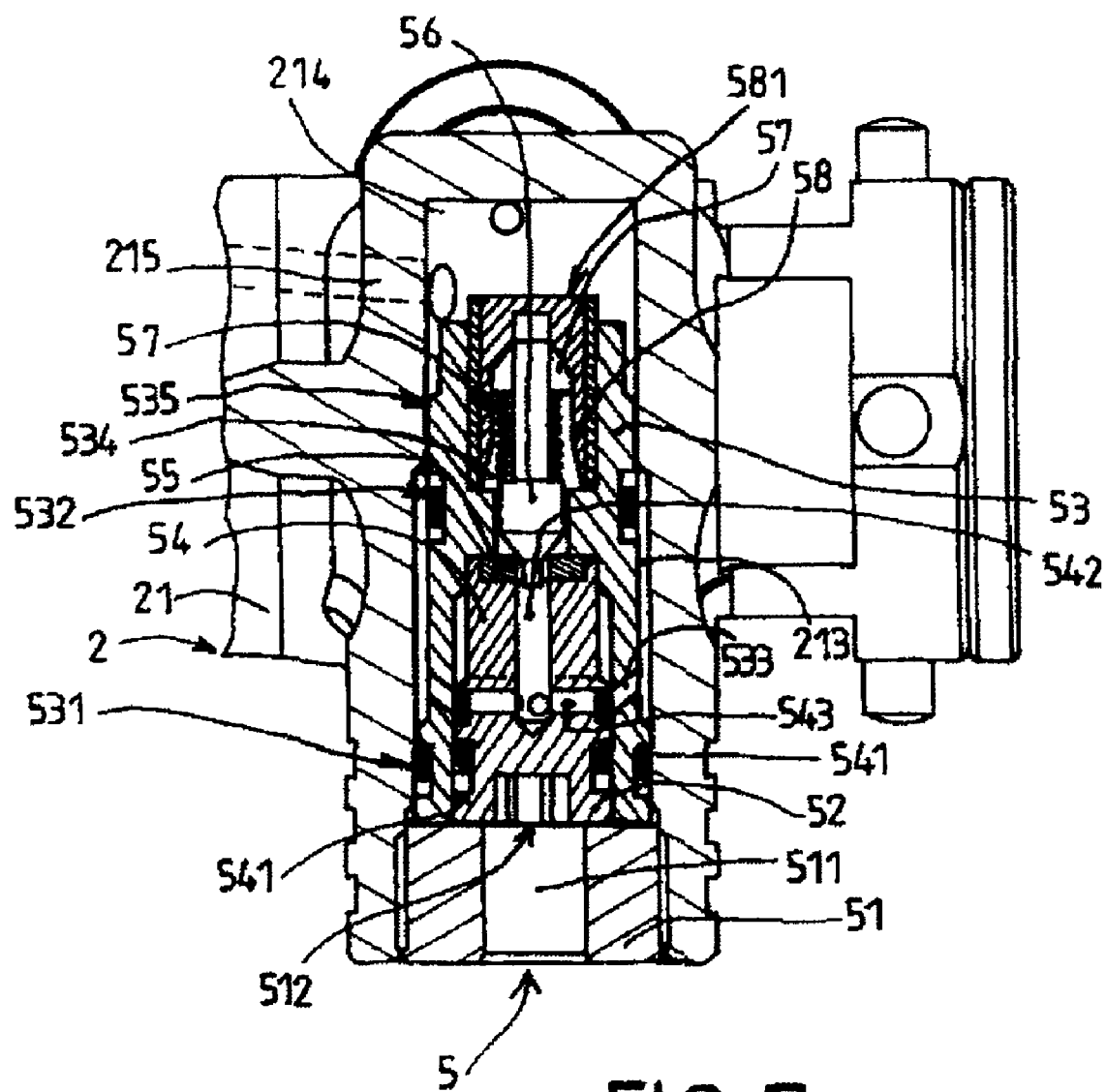
FIG. 7 is a view in longitudinal section of the safety device shown in FIG. 5 in an active position after an overheating.

As represented in FIG. 7, an overheating (due for example to a fire) activates the safety member 5 by causing the fuse 52 to melt, this fuse being evacuated for example through an orifice 511 of the plug 51. The force of the high pressure of the fluid contained in the tank 1 that is applied to the cross section of the cartridge 53 then makes it possible for the cartridge 53 to be moved until it butts against the surface 512 of the plug 51.

The cartridge becomes positioned in a portion of the well of the body 21 in which the sealing elements no longer cooperate against the body 21. In other words, the combination 532 of a seal and anti-extrusion rings then loses its leaktightness function and brings the chamber 214 into communication with the annular chamber 213. In this way, the escape channel is open for the high-pressure fluid coming from the inside of the tank via the orifice 215. From the annular chamber 213, the fluid is evacuated toward the outside through the bore 212.

The gas can be evacuated differently depending on whether the tank 1 is or is not connected to a user circuit.

If the tank 1 is connected to its outlet coupling 900 by its control member 2 (cf. FIG. 6), the fluid passing through the bore 212 arrives in the annular chamber 211 of the body and then passes through the bores 356 of the cannula 35 so as to be situated in the annular chamber 359 formed between the pin 904 and the cannula 35. This chamber 359 formed between the pin 904 and the cannula 35 communicates with the upstream chamber 358 containing the shutter 33. This communication is made possible by the geometry of the end of the pin 904 (diameter in particular), providing a clearance between the pin 904 and the sealing system 352 (seal and anti-extrusion ring).

From the chamber 358, the fluid is evacuated toward the central duct 902 of the outlet coupling 900 via the milled-out aperture 908 machined into the pin 904. The duct 902 emerges into a network of the application comprising, for example, a main line 100 and an auxiliary safety line 101 connected to the main line 100. The auxiliary line 101 comprises a mechanism 950 forming a high-pressure safety valve designed to evacuate the pressurized gas toward the atmosphere in a defined region when the pressure of the gas exceeds a limit value.

Thus, the high-pressure fluid which escapes from the tank in the event of overheating is evacuated by the safety valve 950 which, by virtue of an evacuation conduit or the like, leads the fluid to the atmosphere in a known and controlled region of, for example, a vehicle.

If, on the other hand, the full tank 1 is not connected, for example if it is at rest in a storage phase (cf. FIG. 3), the fluid coming from the tank and passing through the bore 212 arrives in the annular chamber 211 and then passes through the bores 356 of the cannula 35 so as to be situated in the annular chamber 339.

The clearance provided between the shutter 33 and the cannula 35 then allows evacuation of the high-pressure fluid drained toward the atmosphere via the orifice 31.

The gas filling and/or drawing control system according to the invention thus allows:
- the fluid to be admitted, via the filling circuit, to the inside of a tank during container filling phases, this taking place when the filling pressure is above a threshold pressure defined to prevent contamination of the container and the contents,
- the fluid contained under high pressure in the container to be isolated from the ambient air (nonreturn function of the valve element 56 in particular),
- in the event of a rise in temperature due, for example, to a fire, the fluid contained under high pressure in the container to be evacuated out of the container.

The safety evacuation or escape can take place:
- via the orifice 31 of the connection interface when the container is not connected (for example transported or stored during logistics phases),
- via the safety circuit of a supply network when the container is connected (for example a network of a fuel cell or of a vehicle).

The outflow of the escape gas (in the event of overpressure) occurs via the orifice (preferably a single orifice) which serves equally for filling and drawing. Thus, the gas uses one and the same orifice for filling/drawing/escaping in the event of overpressure. This allows a single connection to the tank and hence simplifies the operations for a user. The gas evacuated in the event of overpressure in the tank can thus be collected through this orifice toward a user circuit, toward a safeguarded region. This characteristic is particularly advantageous when the gas is at risk, such as hydrogen.

Of course, the invention is not limited to the exemplary embodiment described above. Thus, for example, the safety device could comprise a high-pressure discharge valve designed to evacuate the fluid toward the outside when the pressure inside the container 1 exceeds a defined value above a threshold, the threshold being greater than the storage pressure.

Advantageously, the high-pressure discharge valve function can be performed by the fusible spacer 52 of the safety member 5. For example, the fusible spacer 52 could consist of a spring which is able to convert the safety device into a high-pressure discharge valve by allowing the plug 53 (or cartridge) to move under certain pressure conditions. In that case, the force provided by the spring on the cartridge 53 must be greater than the force produced by the pressure of the filling fluid.

In a variant, it would likewise be possible for a spring to be inserted between the fusible spacer 52 and the cartridge 53 of the safety device 5 such that said safety device 5 evacuates the fluid contained in the tank in the event of a rise in the ambient temperature and/or in the event of an overpressure of the fluid contained in the tank.

In a variant, the shutter 33 may be produced from a fusible material (eutectic alloy with a low melting point, for example a bismuth-indium alloy) so as to melt at the same time in the event of overheating and thus allow a greater gas flow at the level of the central orifice 31.

Furthermore, the thermal fuse may be replaced by any other safety element, for example: a rupture disk, a discharge valve, or a valve controlled as a function of a measured temperature and/or pressure.

The invention can thus be used in all applications requiring a high ease of use and a good compromise between lightness of weight, size and capacity (autonomy). By way of non-limiting example, the invention is applicable to gaseous hydrogen for a portable or mobile fuel cell, to medical gases and to gases for analysis purposes and laboratories.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A member for controlling filling and/or drawing of a pressurized gas, said member being adapted and configured to be mounted in an orifice of a tank, comprising a body provided with at least one gas flow control device arranged between a first end, comprising an orifice forming an inlet and/or an outlet for the gas with respect to the tank, and a second end adapted and configured to communicate with the inside of the tank, the control member additionally comprising a gas escape safety device for evacuating the gas from the tank in the event of a risk situation and comprising a gas escape circuit extending between a first end, adapted and configured to communicate with the pressurized gas of the tank, and a second end adapted and configured to communicate with a user circuit or with the atmosphere, the escape circuit being either shut off or not depending on a state of a safety element, wherein the second end of the gas escape circuit coincides with the control device orifice forming the inlet and/or the outlet for the gas.

2. The member of claim 1, wherein the second end of the gas escape circuit coincides with a control member inlet/outlet orifice both adapted and configured to let gas in and to let gas out.

3. The member of claim 1, wherein the member further comprises an expansion portion accommodating a pre-expansion device, the control member additionally comprising a mounting portion adapted and configured to be mounted in the orifice of the tank, the expansion portion and the mounting portion being arranged relatively on the body in such a way as to arrange the expansion portion at least partially inside the volume of a tank when the member is in the mounted position.

4. The member of claim 3, wherein the safety element and the expansion portion are respectively arranged substantially on either side of the mounting portion in such a way as to arrange the safety element at least partially outside a volume of the tank when the member is in the mounted position.

5. The member of claim 1, wherein the safety device comprises a shut-off element capable of being moved between a position in which it shuts off the gas escape circuit and a position in which is does not obstruct this circuit, the safety element forming a retractable stop for retaining the shut-off element in the shut-off position.

6. The member of claim 1, wherein the member further comprises a filling circuit for the pressurized gas that extends between a first end, adapted and configured to be connected to a pressurized filling gas source, and a second end adapted and configured to communicate with a tank, a filling valve device being arranged on the filling circuit, the filling valve being dimensioned to open only above a threshold pressure so as to allow pressurized gas to flow between the two ends of the filling circuit only in a filling direction and when the pressure of the filling gas exceeds said threshold.

7. The member of claim 5, wherein the filling valve is able to move relative to a seat secured to a frame, the element for shutting off the escape circuit comprising said frame.

8. The member of claim 6, wherein the filling and escape circuits comprise at least one common portion.

9. The member of claim 1, wherein the member further comprises a high-pressure discharge valve having a first end, adapted and configured to be connected with the pressurized gas in the mounted position, and a second end connected to an outlet for evacuating fluid when the pressure exceeds a defined value above a threshold.

10. The member of claim 1, wherein the safety element comprises at least one of the safety elements from the following group: a thermal fuse, a rupture disk, a discharge valve, and a valve controlled as a function of a measured pressure and/or temperature.

11. A pressurized gas container comprising an orifice and a member as set forth in claim 1, arranged in its orifice.

12. A pressurized gas use circuit, comprising the container of claim 11 connected to the use circuit via the control member, the circuit being connected to the inlet/outlet orifice of the control member.

13. The use circuit of claim 12, comprising a main line connected to a gas user and an auxiliary safety line connected to the main line, the mechanism forming a high-pressure safety valve being situated in the main line and/or in the auxiliary line.

14. A member for controlling filling and/or drawing of a pressurized gas, said member being adapted and configured to be mounted in an orifice of a tank, comprising a body provided with at least one gas flow control device arranged between a first end, comprising an orifice forming an inlet and/or an outlet for the gas with respect to the tank, and a second end adapted and configured to communicate with the inside of the tank, the control member additionally comprising a gas escape safety device for evacuating the gas from the tank in the event of a risk situation and comprising a gas escape circuit extending between a first end, adapted and configured to communicate with the pressurized gas of the tank, and a second end adapted and configured to communicate with a user circuit or with the atmosphere, the escape circuit being either shut off or not depending on a state of a safety element, the member further comprising a gas drawing circuit extending between a first end, adapted and configured to be connected in the mounted position with the inside of the tank, and a second end adapted and configured to be connected to a user circuit which uses the gas drawn from the tank, wherein the second end of the gas escape circuit coincides with the second end of the gas drawing circuit.

15. The member of claim 14, wherein the member further comprises, arranged in the drawing circuit and in addition to a pre-expansion device, at least one of the control elements from the following group: a gas filtering element, a device forming a residual pressure valve, and an isolating valve.

16. The member of claim 15, wherein the member further comprises, arranged in series in the drawing circuit between the first and the second end: a gas filtering element, a device forming a residual pressure valve, the pre-expansion device and an isolating valve.

17. The member of claim 14, wherein the drawing circuit is substantially rectilinear between its two ends.

* * * * *